United States Patent
Masunaga et al.

(10) Patent No.: US 9,333,973 B2
(45) Date of Patent: *May 10, 2016

(54) SPEED CHANGE CONTROL SYSTEM FOR VEHICLES

(75) Inventors: Seiji Masunaga, Susono (JP); Yoshio Hasegawa, Chiryu (JP); Seiji Kuwahara, Toyota (JP); Nobufusa Kobayashi, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/398,605

(22) PCT Filed: May 8, 2012

(86) PCT No.: PCT/JP2012/061726
§ 371 (c)(1),
(2), (4) Date: Nov. 3, 2014

(87) PCT Pub. No.: WO2013/168226
PCT Pub. Date: Nov. 14, 2013

(65) Prior Publication Data
US 2015/0120155 A1    Apr. 30, 2015

(51) Int. Cl.
*B60W 10/04*     (2006.01)
*B60W 10/10*     (2012.01)
(Continued)

(52) U.S. Cl.
CPC .............. *B60W 30/19* (2013.01); *B60W 10/04* (2013.01); *B60W 10/06* (2013.01); *B60W 10/11* (2013.01); *F02D 29/02* (2013.01); *F16H 61/06* (2013.01); *F16H 61/061* (2013.01); *F16H 61/684* (2013.01); *B60W 2710/0666* (2013.01);
(Continued)

(58) Field of Classification Search
CPC ..... B60W 10/04; B60W 10/10; B60W 30/19; B60W 2710/105; F16H 2059/405
See application file for complete search history.

(56) References Cited

U.S. PATENT DOCUMENTS

2008/0017467 A1    1/2008   Honma et al.
2014/0046560 A1*   2/2014   Masunaga et al. .............. 701/58
(Continued)

FOREIGN PATENT DOCUMENTS

JP       2001-227637 A    8/2001
JP       2007198564 A     8/2007
(Continued)

OTHER PUBLICATIONS

U.S. Office Action dated Aug. 13, 2015 in U.S. Appl. No. 14/398,505.
(Continued)

*Primary Examiner* — Tisha Lewis
(74) *Attorney, Agent, or Firm* — Kenyon & Kenyon LLP (57) ABSTRACT

A speed change control system for reducing shift shocks of clutch-to-clutch shifting is provided. The control system is applied to a vehicle in which a transmission having engagement devices is connected to an output side of a prime mover, and in which a gear stage of the transmission is shifted among a plurality of stages by changing engagement states of the engagement devices. The speed change control system carries out a clutch-to-clutch shifting from a predetermined gear stage to another gear stage by reducing a torque capacity of the predetermined engagement device to be disengaged while increasing a torque capacity of another engagement device to be engaged.

6 Claims, 3 Drawing Sheets

(51) Int. Cl.
    *F16H 59/40* (2006.01)
    *B60W 30/19* (2012.01)
    *F16H 61/06* (2006.01)
    *F16H 61/684* (2006.01)
    *B60W 10/11* (2012.01)
    *F02D 29/02* (2006.01)
    *B60W 10/06* (2006.01)
    *F16H 59/42* (2006.01)

(52) U.S. Cl.
    CPC .. *B60W2710/105* (2013.01); *B60W 2710/1005* (2013.01); *F16H 2059/405* (2013.01); *F16H 2059/425* (2013.01); *F16H 2302/00* (2013.01); *F16H 2306/42* (2013.01)

(56) References Cited

U.S. PATENT DOCUMENTS

2014/0200778 A1* 7/2014 Ota et al. .................. 701/54
2015/0184740 A1* 7/2015 Masunaga et al. .............. 701/58

FOREIGN PATENT DOCUMENTS

| | | |
|---|---|---|
| JP | 2008-025637 A | 2/2008 |
| JP | 2008-051186 A | 3/2008 |
| JP | 2008057760 A | 3/2008 |

OTHER PUBLICATIONS

Notice of Allowance issued on Feb. 9, 2016, in U.S. Appl. No. 14/398,505.

* cited by examiner

SPEED CHANGE CONTROL SYSTEM FOR VEHICLES

CROSS-REFERENCE TO RELATED APPLICATIONS

This is a national phase application based on the PCT International Patent Application No. PCT/JP2012/061726 filed May 8, 2012, the entire contents of which are incorporated herein by reference.

TECHNICAL FIELD

The present invention relates generally to a system for controlling a speed change operation of an automobile, and more particularly, to a system configured to shift a gear stage while engaging or disengaging an engagement device such as a clutch and a brake.

BACKGROUND ART

A speed ratio of an automobile is governed by a mechanism for transmitting torque from a prime mover such as an engine to drive wheels. In general, a gear stage of a vehicle transmission including a forward stage and a reverse stage is selected by selecting a gear pair for transmitting the torque from a plurality of gear pairs by a clutch. Given that the transmission is formed by combining a plurality of planetary gear units, a torque transmission route is changed depending on engagement states of a clutch and a brake. Alternatively, the gear stage of the transmission may also be shifted by changing engagement states of the clutch and the brake thereby changing a reaction element or an output element of the planetary gear unit. In the transmissions of those kinds, the gear stage including the forward stage and the revers stage can be changed by disengaging the engagement device engaged to establish the current gear stage while engaging another engagement device to establish another gear stage. Such method is called "the clutch-to-clutch shifting". However, if torque transmitting capacities of both engagement devices to be engaged and disengaged are insufficient during the clutch-to-clutch shifting, so-called a "retraction" feeling may be caused by a torque drop. By contrast, if torque transmitting capacities of both engagement devices to be engaged and disengaged are excessive, shocks may be caused by a torque reduction resulting from a transmission tie-up.

Therefore, the torque transmitting capacities of the engagement devices to be engaged and disengaged have to be controlled in just proportion. Various kinds of control systems and methods have been proposed for this application. For example, Japanese Patent Laid-Open No. 2008-051186 describes a shift control system. According to the teachings of Japanese Patent Laid-Open No. 2008-051186, a torque of one of clutches involved in the clutch-to-clutch shifting is determined based on a torque sharing rate between a target output torque of a transmission and a torque of said one of the clutches, and a torque of the other clutch is determined based on the torque of said one of the clutches and the target output torque. In addition, the torque of the clutch to be disengaged is reduced gradually in a manner such that the torque becomes zero at a commencement of an inertia phase. Accordingly, the torque will not be applied to the clutch to be disengaged during the inertia phase, and the shifting operation is progressed by increasing hydraulic pressure applied to the clutch to be engaged. In addition, according to the teachings of Japanese Patent Laid-Open No. 2008-051186, the torque sharing rate is differentiated before and after the commencement of the inertia phase. Specifically, the torque sharing rate of the clutch for the former gear stage is employed before the commencement of the inertia phase, and the torque sharing rate of the clutch for the gear stage to be achieved after shifting is employed after the commencement of the inertia phase.

Japanese Patent Laid-Open No. 2001-227637 also describes a control device for automatic transmission configured to change a torque transmitting capacity of the clutch to be engaged in accordance with a change in an input speed during a torque phase of the clutch-to-clutch shifting. If the torque transmitting capacity of the clutch to be engaged is insufficient during the clutch-to-clutch shifting, an engine speed or an input speed is increased while the power is on. By contrast, if the torque transmitting capacity of the clutch to be engaged is excessive, the "retraction" feeling may be caused by a torque drop resulting from the transmission tie-up. In order to avoid such disadvantages, according to the teachings of Japanese Patent Laid-Open No. 2001-227637, the torque transmitting capacity of the clutch to be engaged is increased in case the input speed is increased, and the torque transmitting capacity of the clutch to be engaged is decreased in case the input speed is lowered.

Japanese Patent Laid-Open No. 2008-025637 describes a control apparatus and method for automatic transmission. According to the teachings of Japanese Patent Laid-Open No. 2008-025637, during the clutch-to-clutch shifting, an input speed and an output speed of a clutch to be disengaged are differentiated by disengaging the clutch to be disengaged. In order to achieve a target speed difference therebetween, a total torque capacity of first and second clutch is calculated, and the torque capacity is distributed to the first and the second clutches in accordance with a determined distribution ratio.

As described, according to the teachings of Japanese Patent Laid-Open No. 2008-051186, the torque transmitting capacity of the clutch to be disengaged or the hydraulic pressure applied thereto is reduced to zero at the commencement of the inertia phase. Therefore, if the torque transmitting capacity of the clutch to be disengaged or the hydraulic pressure applied thereto is increased to a certain extent just before the commencement of the inertia phase, the clutch is disengaged abruptly at the commencement of the inertia phase. In this situation, the torque transmitting capacity of the clutch to be engaged or the hydraulic pressure applied thereto has to be increased abruptly to make up for the reduction in the torque transmitting capacity of the disengaged clutch. Thus, the torque transmitting capacity of the clutch or the hydraulic pressure applied thereto has to be controlled irregularly thereby causing shift shocks. In addition, in order to reduce the torque transmitting capacity of the clutch to be disengaged to zero at the commencement of the inertia phase, man-hour at design phase may be increased. Further, if the torque transmitting capacity of the clutch to be disengaged is thus determined based on the target output torque, the torque transmitting capacity of the clutch to be disengaged has to be changed in response to a change in an accelerator opening or the target output torque during shifting. Consequently, shift shocks may be worsened due to control delay. In addition, a control system and a control software has to be complicated to deal with such disadvantages.

As also described, the control device taught by Japanese Patent Laid-Open No. 2001-227637 is configured to control the clutch to be engaged during the torque phase of the clutch-to-clutch shifting. According to the teachings of Japanese Patent Laid-Open No. 2001-227637, rotational speeds of rotary members including the engine are changed positively.

Therefore, the teachings of Japanese Patent Laid-Open No. 2001-227637 may not be applied to control entire course of the clutch-to-clutch shifting.

The control apparatus and method taught by Japanese Patent Laid-Open No. 2008-025637 are configured to simplify the control of downshifting. Therefore, the control apparatus and method of Japanese Patent Laid-Open No. 2008-025637 cannot be applied to all of the shifting modes of the clutch-to-clutch shifting including upshifting. In addition, according to the teachings of Japanese Patent Laid-Open No. 2008-025637, the shifting operation is carried out while causing a slip of the clutch to be disengaged. Therefore, the clutch may be worn out and damaged.

DISCLOSURE OF THE INVENTION

The present invention has been conceived noting the foregoing technical problems, and it is therefore an object of the present invention is to provide a speed change control system for a vehicle configured to reduce shift shocks resulting from the clutch-to-clutch shifting, and to simplify a control for dealing with a change in a required drive force during shifting.

The speed change control system of the present invention is applied to a vehicle in which a transmission having a plurality of engagement devices is connected to an output side of a prime mover. In the transmission, torque capacities of the engagement devices can be changed continuously so that a gear stage of the transmission can be shifted among a plurality of stages by changing engagement states of the engagement devices. Basically, the speed change control system is configured to carry out a clutch-to-clutch shifting of the gear stage from a predetermined gear stage to another gear stage by gradually reducing a torque capacity of the predetermined engagement device to be disengaged while gradually increasing a torque capacity of another engagement device to be engaged. In order to achieve the above-explained object, according to the present invention, the control system is provided with an output shaft torque calculation means that calculates a target torque value of an output shaft of the transmission on the basis of an input shaft torque of the transmission based on a drive demand of a driver, an angular acceleration of the input shaft of the transmission, an angular acceleration of the output shaft of the transmission, and a torque transmission ratios of the engagement device to be engaged and the engagement device to be disengaged. In addition, the control system is further provided with a torque capacity calculation means that calculates a torque capacities of the engagement device to be engaged and the engagement device to be disengaged during a torque phase and an inertia phase under the clutch-to-clutch shifting, on the basis of the target torque value of the output shaft, the angular acceleration of the input shaft of the transmission, the angular acceleration of the output shaft of the transmission, and the torque transmission ratios of the engagement device to be engaged and the engagement device to be disengaged.

The speed change control system of the present invention is further provided with a prime mover torque calculation means that calculates a required torque value of the prime mover during the torque phase and the inertia phase under the clutch-to-clutch shifting, on the basis of the target torque value of the output shaft, the angular acceleration of the input shaft of the transmission, the angular acceleration of the output shaft of the transmission, and the torque transmission ratios of the engagement device to be engaged and the engagement device to be disengaged.

Specifically, the prime mover torque calculation means may also be configured to calculate the required torque value of the prime mover using an arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged. Meanwhile, the output shaft torque calculation means may also be configured to calculate the target torque value of the output shaft by said arithmetic expression using an output torque of the prime mover based on the drive demand of the driver, the angular acceleration of the input shaft of the transmission, the angular acceleration of the output shaft of the transmission, and the torque transmission ratios of the engagement device to be engaged and the engagement device to be disengaged.

The torque capacity calculation means may also be configured to calculate the torque capacities of the engagement device to be engaged and the engagement device to be disengaged using another arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged.

Thus, according to the present invention, the target torque capacities of the engagement devices are calculated using the arithmetic expression where the target value of the output shaft torque is employed as a variable. Therefore, the target torque capacities of the engagement device to be engaged and the engagement device to be disengaged are allowed to be changed continuously during the torque phase and the inertia phase under the clutch-to-clutch shifting. For this reason, the drive torque will not be changed abruptly so that shift shocks resulting from the clutch-to-clutch shifting can be reduced. If the drive demand of the driver is changed during the transitional state of the shifting, the target value of the output shaft torque has to be changed. However, since the target torque capacities of the engagement devices during the shifting are calculated based on the target value of the output shaft torque, the torque capacities of the engagement devices can be calculated based on the changed drive demand. In this case, the procedures for calculating the torque capacities of the engagement devices will not be changed before and after the change in the drive demand. That is, the torque capacities of the engagement devices can be calculated by the preceding calculation method without requiring a map or data for dealing with a change in the drive demand. Therefore, man-hour at design phase can be reduced by reducing preinstalled data and maps.

BEST MODE FOR CARRYING OUT THE INVENTION

Figure 3:
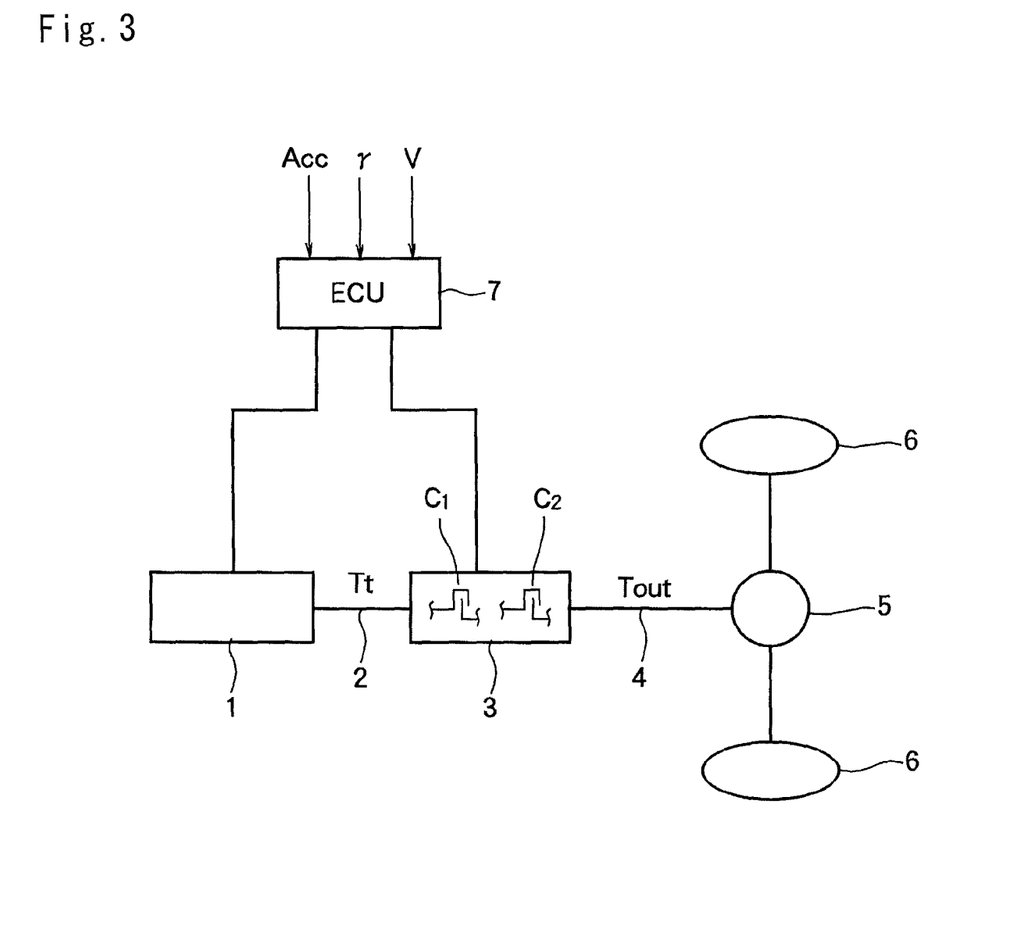
FIG. 3 is a block diagram schematically showing one example of a control system of a vehicle to which the present invention is applied.

The present invention is directed to a control system for a clutch-to clutch shifting of an automatic transmission of a vehicle. FIG. 3 is a block diagram schematically illustrating a preferred example of the vehicle to which the control system applied. As shown in FIG. 3, an automatic transmission 3 is connected to a prime mover 1 through an output shaft 2. According to the preferred example, the prime mover 1 includes an internal combustion engine such as a gasoline engine and a diesel engine, a motor, and a hybrid power source having the engine and the motor. For example, given that the gasoline engine is employed as the prime mover 1, the prime mover 1 is provided with an electronic throttle valve to electrically control an output torque thereof. In this case, specifically, the output torque is generated according to an air intake by electrically controlling an opening degree of the electronic throttle valve, and the output torque is changed temporarily by delaying or advancing an ignition timing by changing a crank angle. Thus, in the vehicle shown in FIG. 3, the prime mover 1 is employed to generate a torque applied to the automatic transmission 3. Accordingly, the prime mover 1 includes a torque converter if available in the vehicle.

In the automatic transmission 3, a predetermined gear stage is established by engaging an engagement device C1, and the gear stage is shifted to another gear stage by engaging another engagement device C2 being disengaged while disengaging the engagement device C1. To this end, not only a clutch device adapted to selectively connect and disconnect rotary members, but also a brake device adapted to selectively connect and disconnect a rotary member to/from a predetermined fixing portion may be used as the engagement device C1 and C2. Thus, a geared transmission is employed as the automatic transmission 3. Here, the automatic transmission 3 is not required to carry out the clutch-to-clutch shift to all of the available gear stage, but required to shift the gear stage only to an intended gear stage(s) by the clutch-to-clutch shifting. Torque capacities of the engagement devices (as will be simply called "the clutch" hereinafter) C1 and C2 are controlled electrically by a hydraulic actuator or an electric actuator. To this end, the automatic transmission 3 is provided with a hydraulic circuit, and a hydraulic pressure therein is controlled using a plurality of electromagnetic valves. Therefore, a speed change operation is carried out by switching an oil passage while controlling the torque capacities of the clutches involving the speed change or establishing the gear stage by the electromagnetic valves. The torque outputted from the output shaft 4 of the automatic transmission 3 is delivered to the differential 5 as a final reduction gear unit, and further transmitted to the drive wheels 6.

In order to control the prime mover 1 and the automatic transmission 3, the control system is provided with an electronic control unit (to be abbreviated as "the ECU" hereinafter) 7 serving as the controller of the present invention. The ECU 7 may be formed by combining control units of the prime mover 1 and the automatic transmission 3. Alternatively, a single microcomputer configured to send control signals to both of the prime mover 1 and the automatic transmission 3 may also be used as the ECU 7. Specifically, the ECU 7 is configured to carry out a calculation based on a preinstalled map, data program etc. and various kinds of incident data. The calculation results are sent to the prime mover 1 and the automatic transmission 3 in the form of command signals. To this end, for example, a shifting diagram for determining the gear stage, a drive force according to a demand of a driver, target angular accelerations of the input shaft 2 and the output shaft 4, a required torque value of the clutch to be disengaged etc. are preinstalled in the form of maps. Those maps are prepared by determining a target value of each of above-mentioned items with respect to a corresponding parameter based on a result of experimentation or simulation. To the contrary, a vehicle speed V, an opening degree Acc of an accelerator, a speed ratio γ etc. are inputted to the ECU 7.

Figure 1:
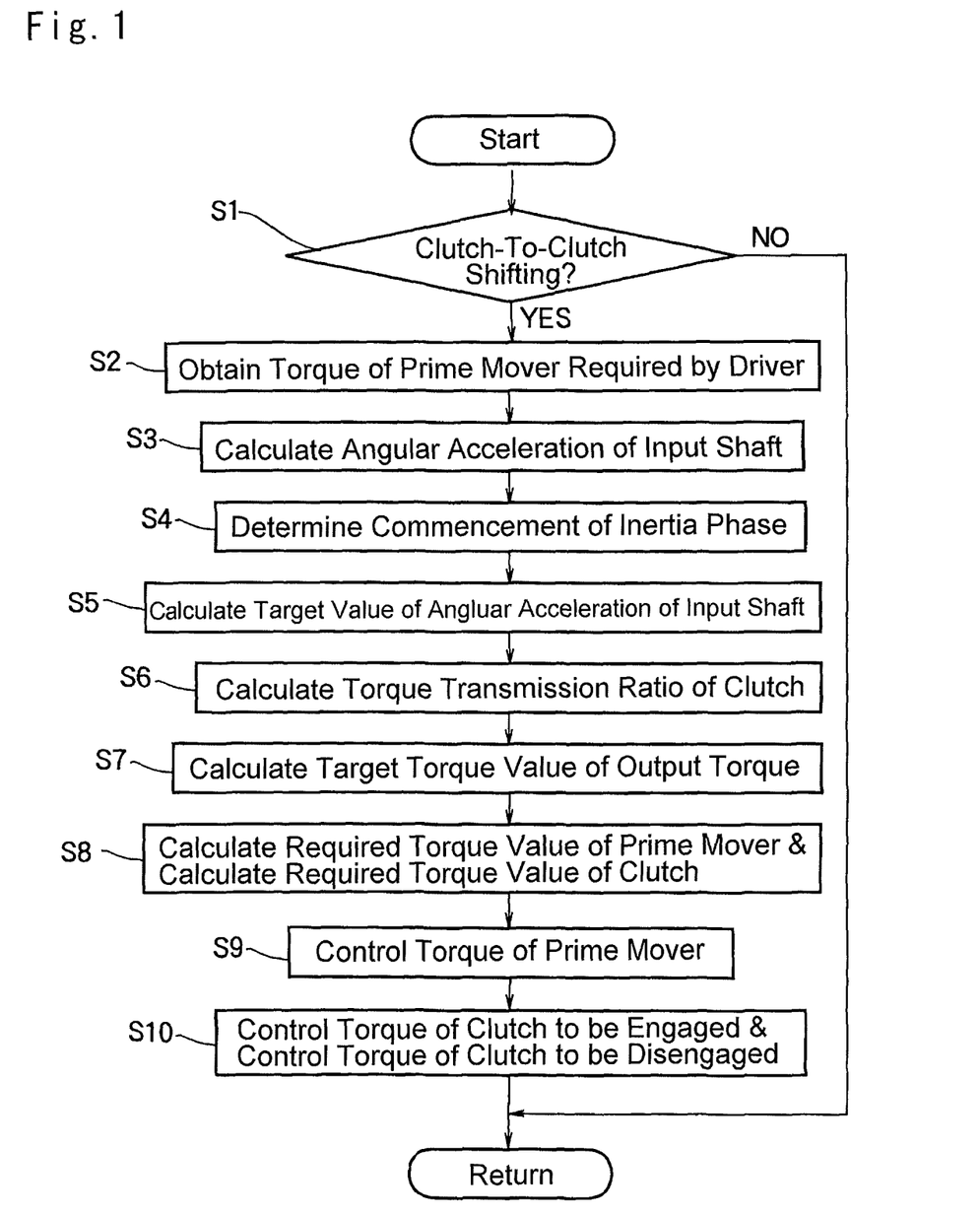
FIG. 1 is a flowchart showing one example of the control carried out by the speed change control system of the present invention.

Referring now to FIG. 1, a preferred example of the control for the clutch-to-clutch shifting to be carried out by the control system according to the present invention will be explained hereinafter. First of all, it is determined whether or not a condition to carry out the clutch-to-clutch shifting is satisfied, in other words, it is determined whether or not a decision to carry out the clutch-to-clutch shifting is made (at step S1). Such decision is made with reference to data about a running condition of the vehicle such as a drive demand represented by the accelerator opening Acc and the vehicle speed, and to the preinstalled shifting diagram. Specifically, the ECU 7 determines to carry out a shifting operation based on a fact that the running condition of the vehicle is shifted from a predetermined speed region to another speed region in the shifting diagram. If the shifting operation thus determined is to be carried out to shift the gear stage from the gear stage being established by engaging the predetermined clutch to the gear stage to be achieved by disengaging the clutch while engaging another clutch, the ECU 7 determines to carry out the clutch-to-clutch shifting.

If the clutch-to-clutch shifting is not to be carried out so that the answer of step S1 is NO, the routine is returned without carrying out any specific control. By contrast, if the answer of step S1 is YES, a torque of the prime mover 1 required by the driver is obtained (at step S2). The required drive force to be generated according to an opening degree of the accelerator with respect to the vehicle speed is governed by a design of the vehicle. To this end, therefore, the required drive force is preinstalled in the form of map using the vehicle speed V and the accelerator opening Acc as parameters, and the required drive force is determined with reference to the map. Accordingly, an estimated value of current torque of the prime mover 1 may also be employed at step S2. Further, a target power of the prime mover 1 is determined based on the required (or estimated) drive force and the vehicle speed. On the other hand, a speed of the prime mover 1 is determined based on predetermined constants such as the vehicle speed V, the speed ratio γ, a gear ratio of the differential 5 etc. Therefore, the torque of the prime mover 1 can be calculated by dividing the target power by the speed. Thus, at step S2, the torque of the prime mover required by the driver is calculated.

Then, an angular acceleration of the output shaft 4 is calculated (at step S3). As described, the output shaft 4 is connected to the drive wheels 6 through the deferential 5. That is, the angular acceleration of the output shaft 4 corresponds to an acceleration of the vehicle. Therefore, the angular acceleration of the output shaft 4 can be obtained based on a rate of change in a detection value of the acceleration corresponding to the vehicle speed V. Specifically, the angular acceleration of the output shaft 4 is obtained by measuring a rotational speed of the output shaft 4 by a speed sensor arranged in the automatic transmission 3, and by applying a signal processing such as a differential processing to the measured speed.

Then, a commencement of the inertia phase is determined (at step S4). The determination of step S4 may be made by a conventional determination method. For example, the commencement of the inertia phase can be determined based on a fact that the rotational speed of the input shaft deviates from a speed achieved by the speed ratio and the vehicle speed of before the shifting operation (or an output shaft speed) to a speed exceeding a predetermined reference speed.

Next, a target value of the angular acceleration of the input shaft 2 is calculated (at step S5). The rotational speed of the input shaft 2 or the prime mover 1, and the torque of the output shaft 4 are changed according to the speed ratio to be achieved after the speed change operation. If those changes are caused abruptly, a shift shock will be worsened. By contrast, if it takes too long to change those speed and torque, a shifting response is worsened to provide the driver with an uncomfortable feeling. In addition, the engagement devices will be worn out. In order to avoid such disadvantages, in general, changes in the rotational speed of the input shaft and the torque of the output shaft are controlled to be completed within a preset shifting time. Thus, the rotational speed of the input shaft is changed from the speed achieved by the speed ratio and the vehicle speed of before the shifting operation to a speed to be achieved by the speed ratio and the vehicle speed of after the shifting, and such change in the rotational speed is completed within the preset time. Accordingly, the target value of the angular acceleration can be obtained based on an amount of change in the rotational speed of the input shaft and a shifting time. The target value of the angular acceleration of the input shaft may be preinstalled in the form of a map for each vehicle speed V and shifting pattern, and calculated with reference to the map.

During the transitional state of the clutch-to-clutch shifting, the torque applied to the automatic transmission 3 is delivered to the output shaft 4 through the clutch to be disengaged and the clutch to be engaged. Therefore, a torque transmission ratio of each clutch is calculated (at step S6). The torque transmission ratio x of the clutch to be engaged or disengaged during the clutch-to-clutch shifting is governed by a structure of the gear train. For example, in case of upshifting, the torque transmission ratio x of the clutch to be engaged to achieve the low speed stage can be expressed as xlow (x=xlow). During the upshifting, the torque transmission ratio xlow of the clutch to be engaged to achieve the low speed stage is reduced gradually from "1" to "0". Meanwhile, a torque transmission ratio xhi of the clutch to be engaged to achieve the high speed stage is increased gradually from "0" to "1". Accordingly, the torque transmission ratio xhi of the clutch to be engaged to achieve the high speed stage can be expressed as "1-x", and the torque transmission ratios xlow and xhi during the clutch-to-clutch shifting can be calculated based on the torque transmission ratio x governed by the structure of the gear train.

Then, a target torque value of the output shaft 4 (i.e., a target output shaft torque) is calculated (at step S7). Details of calculation will be explained later.

After obtaining the foregoing data, a required torque value of the prime mover 1 and a required torque value of the clutches are calculated (at step S8). Specifically, an equation of motion for the automatic transmission 3 during shifting can be expressed by the conventional expression (1):

$$\begin{bmatrix} \dot{\omega}_t \\ T_o \end{bmatrix} = \begin{bmatrix} a_1 & b_1 & c_1 & d_1 \\ a_2 & b_2 & c_2 & d_2 \end{bmatrix} \begin{bmatrix} T_t \\ T_{clow} \\ T_{chi} \\ \dot{\omega}_o \end{bmatrix} \quad (1)$$

where $\dot{\omega}_t$ ($d\omega_t/d_t$) is the target value of the angular acceleration of the input shaft calculated at step S5, $\dot{\omega}_o$ ($d\omega_o/d_t$) is the angular acceleration of the output shaft calculated at step S3, $T_o$ is the target torque of the output shaft calculated at step S7, $T_t$ is the torque of the prime mover calculated at step S2, $T_{clow}$ is a torque of the clutch engaged under the gear stage of low speed side established before the shifting or to be established after the shifting, $T_{chi}$ is a torque of the clutch engaged under the gear stage of high speed side established before the shifting or to be established after the shifting, and a1, a2, b1, b2, c1, c2, d1 and d2 are predetermined constants used in the equation of motion for the gear train of the automatic transmission 3. More specifically, those required torque value can be calculated based on the speed ratio, the inertia moment of each rotary member such as the rotary shaft, and the engagement state of each engagement device.

Before the commencement of the clutch-to-clutch shifting, any one of the clutches to be engaged to achieve the high speed stage or low speed stage is disengaged, that is, the clutch torque $T_{clow}$ or $T_{chi}$ is zero. Accordingly, in case of upshifting, the torque $T_{chi}$ of the clutch to be engaged to achieve the high speed stage is zero, and the torque $T_{clow}$ of the clutch to be engaged to achieve the low speed stage can be expressed by the following expression (2):

$$T_{clow} = \frac{-a_2(\dot{\omega}_t - d_1\dot{\omega}_o) + a_1(T_o - d_2\dot{\omega}_o)}{a_1 b_2 - b_1 a_2}. \quad (2)$$

After the commencement of the shifting, the torque $T_{clow}$ of the clutch to be engaged to achieve the low speed stage is gradually reduced with the progression of the shifting, and at the same time, the torque $T_{chi}$ of the clutch to be engaged to achieve the high speed stage is gradually increased with the progression of the shifting. As described, a relation between the clutch to be engaged to achieve the high speed stage and the clutch to be disengaged to achiever the low speed stage is governed by the above-explained torque transmission ratio. Accordingly, the torque $T_{clow}$ of the clutch to be engaged to achieve the low speed stage can be expressed by the following expression (3):

$$T_{clow} = \frac{-a_2(\dot{\omega}_t - d_1\dot{\omega}_o) + a_1(T_o - d_2\dot{\omega}_o)}{a_1 b_2 - b_1 a_2} x \quad (3)$$

$$= \frac{-a_2(\dot{\omega}_t - d_1\dot{\omega}_o) + a_1(T_o - d_2\dot{\omega}_o)}{a_1 b_2 - b_1 a_2} x_{low}.$$

Likewise, the torque $T_{chi}$ of the clutch to be engaged to achieve the high speed stage can be expressed by the following expression (4):

$$T_{chi} = \frac{-a_2(\dot{\omega}_t - d_1\dot{\omega}_o) + a_1(T_o - d_2\dot{\omega}_o)}{c_1 a_2 - a_1 c_2}(1 - x) \quad (4)$$

$$= -\frac{-a_2(\dot{\omega}_t - d_1\dot{\omega}_o) + a_1(T_o - d_2\dot{\omega}_o)}{c_1 a_2 - a_1 c_2} x_{hi}.$$

Accordingly, the required torque values of the clutch to be engaged to achieve the low speed stage and the clutch to be engaged to achieve the high speed stage, and the required torque value of the prime mover during the torque phase and the inertia phase under the clutch-to-clutch shifting can be calculated using the following arithmetic expression (5):

$$\begin{bmatrix} T_t \\ T_{clow} \\ T_{chi} \end{bmatrix} = \begin{bmatrix} \dfrac{b_2}{a_1b_2 - a_2b_1}x - & -\dfrac{b_1}{a_1b_2 - a_2b_1}x + \\ \dfrac{c_2}{c_1a_2 - c_2a_1}(1-x) & \dfrac{c_1}{c_1a_2 - c_2a_1}(1-x) \\ -\dfrac{a_2}{a_1b_2 - a_2b_1}x_{low} & \dfrac{a_1}{a_1b_2 - a_2b_1}x_{low} \\ \dfrac{a_2}{c_1a_2 - c_2a_1}x_{hi} & -\dfrac{a_1}{c_1a_2 - c_2a_1}x_{hi} \end{bmatrix} \begin{bmatrix} \dot{\omega}_t - d_1\dot{\omega}_o \\ T_o - d_2\dot{\omega}_o \end{bmatrix}. \quad (5)$$

Here will be explained details of the calculation carried out at step S7 to calculate the target output shaft torque. Specifically, the target torque $T_o$ of the output shaft can be calculated by plugging the target value of the angular acceleration of the input shaft, the angular acceleration of the output shaft, the torque of the prime mover required by the driver, and the torque transmission ratios of the clutches, into the above-explained expression (5) for calculating the torque $T_t$ of the prime mover, as expressed by the following expression (6):

$$T_o = \dfrac{T_t - \left(\dfrac{b_2}{a_1b_2 - a_2b_1}x - \dfrac{c_2}{c_1a_2 - c_2a_1}(1-x)\right)(\dot{\omega}_t - d_1\dot{\omega}_o)}{-\dfrac{b_1}{a_1b_2 - a_2b_1}x + \dfrac{c_1}{c_1a_2 - c_2a_1}(1-x)} + d_2\dot{\omega}_o. \quad (6)$$

By thus using the expression (6), the target output shaft torque can be determined in a manner such that the torque $T_t$ of the prime mover is not required to be changed. Alternatively, it is also possible to determine an arbitrary target output shaft torque. In this case, the torque $T_t$ of the prime mover is required to be changed.

Then, the controller sends those required torque values $T_t$, $T_{chi}$ and $T_{clow}$ in the form of command signals to control the torque of the prime mover (at step S9), and to control the torque of the clutch to be engaged and the torque of the clutch to be disengaged (at step S10). To this end, if the prime mover is a gasoline engine, the torque thereof can be controlled by delaying an ignition timing by changing a crank angle, or by controlling an opening degree of the throttle valve. On the other hand, the torque of each clutch can be controlled by controlling an engagement pressure applied thereto.

Figure 2:
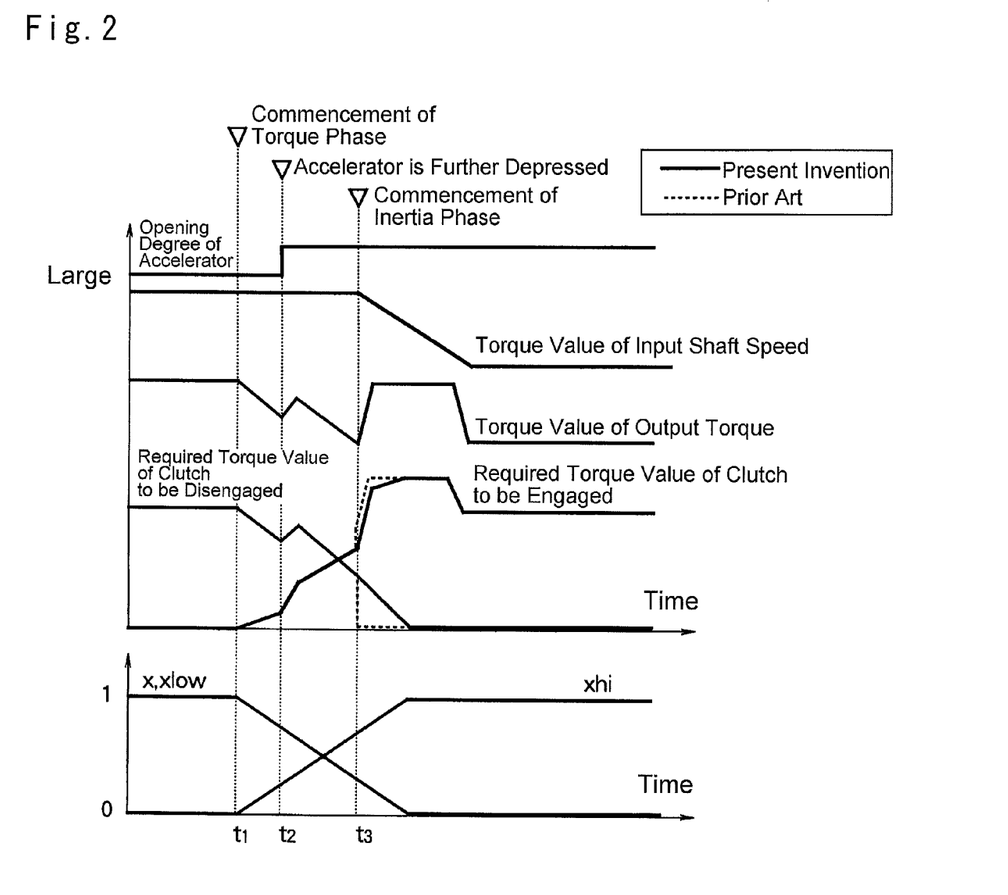
FIG. 2 is a timechart showing one example of a change in required torque values of clutches during execution of the control shown in FIG. 1 under power-on-upshifting.

Changes in the required torque values of the clutches under the power-on-upshifting carried out by the above-explained procedures are indicated in the time chart shown in FIG. 2. When the decision to carry out the clutch-to-clutch shifting is made at a point t1, the required torque value of the clutch to be disengaged starts lowering, and at the same time, the required torque value of the clutch to be disengaged starts increasing. Specifically, the torque transmission ratio xlow of the clutch to be engaged to achieve the low speed stage is reduced gradually from "1", and the torque transmission ratio xhi of the clutch to be engaged to achieve the high speed stage is increased gradually from "0". During the torque phase, the target value of the input shaft speed is determined in a manner to maintain the rotational speed of the input shaft, and the target value of the output shaft torque calculated by the expression (6) is used in this situation.

Thus, the torques of the clutch to be engaged and the clutch to be disengaged are controlled during the torque phase. In this situation, when the accelerator is (further) depressed so that the drive demand is increased (at point t2), the target output shaft torque is increased in response to an augmentation of the drive force as can be seen from the expression (6). As explained with reference to the expressions (3) to (5), the required torque values of the clutch to be engaged and the clutch to be disengaged are determined based on the target value of the output shaft torque. Therefore, the required torque value of the clutch to be disengaged is changed in response to the change in the required drive force. Such change in the required torque value is caused by the conventional calculations. That is, different from a control for retrieving a lowering gradient of the required torque value of the clutch to be disengaged from a map or the like, the required torque value can be changed without causing delay and without altering the arithmetic expression. In other words, control delay and resultant shift shocks can be reduced. In addition, in the example shown in FIG. 2, the required torque value of the clutch to be engaged is also increased in response to the augmentation of the target value of the output shaft torque by thus maintaining the torque transmission ratio.

The torque of the clutch to be engaged (to achieve the high speed stage) is further increased and the torque of the clutch to be disengaged (i.e., engaged to achieve the low speed stage) is further reduced with the progression of the shifting. In this situation, when the rotational speeds of the rotary members including the prime mover 1 start changing, a commencement of the inertia phase is determined (at point t3). Consequently, the target torque value of the output shaft is changed in the amount of inertia torque. Specifically, in case of upshifting, the rotational speeds are lowered, therefore, the target value of the output shaft torque is increased in the amount of inertia torque. The speed change control system of the present invention is configured to carry out the above-explained controls by calculating the clutch torques and the prime mover torque during the inertia phase using the common expression that is also used during the torque phase. Therefore, the required torque value of the clutch to be disengaged is reduced smoothly to be zero after the commencement of the inertia phase across the point t3 at which the inertia phase commences.

As in the torque phase, the required torque value of the clutch to be engaged is calculated using the above-explained expression even after the commencement of the inertia phase. Therefore, as shown in FIG. 2, the required torque value of the clutch to be engaged is changed continuously during the upshifting with the reduction in the target value of the input shaft speed and the augmentation in the target torque value of the output shaft. For this reason, the required torque values of the clutches to be engaged and disengaged will not be changed abruptly or stepwise. That is, the shift shocks will not be worsened. For reference, in FIG. 2, changes in the required torque values of the clutches to be engaged and disengaged caused by carrying out the control taught by Japanese Patent Laid-Open No. 2008-051186 are indicated by broken lines. As indicated by the broken lines, according to the prior art, the required torque value of the clutch to be disengaged is reduced to zero at the commencement of the inertia phase. Consequently, the required torque value of the clutch to be engaged is increased abruptly to cause shift shocks.

The shift shocks may also be reduced by the foregoing speed change control of the present invention under power-off-upshifting, power-on-downshifting and power-off-upshifting. Thus, according to the speed change control system of the present invention, the common arithmetic expression is used to calculate the clutch torques and the prime mover torque not only under upshifting but also under downshifting. Therefore, the calculating device and the control software can be simplified.

Here will be briefly explained a relation between the preferred example and the present invention. The functional means of the ECU 7 to carry out the control of step S7 shown in FIG. 1 serves as the output shaft torque calculation means, and the functional means of the ECU 7 to carry out the control of step S8 serves as the prime mover torque calculation means of the present invention.

The invention claimed is:

1. A speed change control system, that is applied to a vehicle in which a transmission having a plurality of engagement devices whose torque capacities are changed continuously is connected to an output side of a prime mover, and in which a gear stage of the transmission is shifted among a plurality of stages by changing engagement states of the engagement devices, and that is configured to carry out a clutch-to-clutch shifting of the gear stage from a predetermined gear stage to another gear stage by gradually reducing a torque capacity of the predetermined engagement device to be disengaged while gradually increasing a torque capacity of another engagement device to be engaged, comprising:

an output shaft torque calculator that calculates a target torque value of an output shaft of the transmission on the basis of an input shaft torque of the transmission based on a drive demand of a driver, an angular acceleration of the input shaft of the transmission, an angular acceleration of the output shaft of the transmission, and a torque transmission ratios of the engagement device to be engaged and the engagement device to be disengaged; and a torque capacity calculator that calculates a torque capacities of the engagement device to be engaged and the engagement device to be disengaged during a torque phase and an inertia phase under the clutch-to-clutch shifting using a common arithmetic expression, on the basis of the target torque value of the output shaft, the angular acceleration of the input shaft of the transmission, the angular acceleration of the output shaft of the transmission, and the torque transmission ratios of the engagement device to be engaged and the engagement device to be disengaged that changes with a progression of the clutch-to-clutch shifting.

2. The speed change control system as claimed in claim 1, further comprising:

a prime mover torque calculator that calculates a required torque value of the prime mover during the torque phase and the inertia phase under the clutch-to-clutch shifting, on the basis of the target torque value of the output shaft, the angular acceleration of the input shaft of the transmission, the angular acceleration of the output shaft of the transmission, and the torque transmission ratios of the engagement device to be engaged and the engagement device to be disengaged.

3. The speed change control system as claimed in claim 2, wherein the prime mover torque calculator is configured to calculate the required torque value of the prime mover using an arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged; and wherein the output shaft torque calculator is configured to calculate the target torque value of the output shaft by said arithmetic expression using an output torque of the prime mover based on the drive demand of the driver, the angular acceleration of the input shaft of the transmission, the angular acceleration of the output shaft of the transmission, and the torque transmission ratios of the engagement device to be engaged and the engagement device to be disengaged.

4. The speed change control system as claimed in claim 1, wherein the torque capacity calculator is configured to calculate the torque capacities of the engagement device to be engaged and the engagement device to be disengaged using another arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged.

5. The speed change control system as claimed in claim 2, wherein the torque capacity calculator is configured to calculate the torque capacities of the engagement device to be engaged and the engagement device to be disengaged using another arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged.

6. The speed change control system as claimed in claim 3, wherein the torque capacity calculator is configured to calculate the torque capacities of the engagement device to be engaged and the engagement device to be disengaged using another arithmetic expression derived from an equation of motion for the transmission that determines a relation among the target torque value of the output shaft, the angular acceleration of the input shaft of the transmission, the angular acceleration of the output shaft of the transmission, and the torque transmission ratios of the engagement device to be engaged and the engagement device to be disengaged.

* * * * *